(12) United States Patent
Berge et al.

(10) Patent No.: US 9,192,178 B2
(45) Date of Patent: Nov. 24, 2015

(54) GRIDDLE HAVING ATTACHED WARMING PLATE

(75) Inventors: Michael R. Berge, Eau Claire, WI (US); Russell W. Hall, Eau Claire, WI (US)

(73) Assignee: National Presto Industries, Inc., Eau Claire, WI (US)

( * ) Notice: Subject to any disclaimer, the term of this patent is extended or adjusted under 35 U.S.C. 154(b) by 550 days.

(21) Appl. No.: 13/587,606

(22) Filed: Aug. 16, 2012

(65) Prior Publication Data

US 2014/0050834 A1    Feb. 20, 2014

(51) Int. Cl.
| A47J 37/10 | (2006.01) |
| A23L 1/01 | (2006.01) |
| A47J 37/06 | (2006.01) |

(52) U.S. Cl.
CPC ............... *A23L 1/01* (2013.01); *A47J 37/0676* (2013.01)

(58) Field of Classification Search
CPC ................................. A23L 1/01; A47J 27/0676
USPC .................... 426/438, 441; 99/369, 372, 389, 99/400–418; 219/450.1, 452.13, 620–624, 219/725, 730; 206/507–508
See application file for complete search history.

(56) References Cited

U.S. PATENT DOCUMENTS

| 345,530 | A | * | 7/1886 | Paris ................................. 126/4 |
| 2,274,285 | A | * | 2/1942 | Walker ........................ 219/387 |
| D139,751 | S | | 12/1944 | Springwell |
| 2,547,982 | A | * | 4/1951 | Sivley ............................. 99/423 |
| D286,494 | S | | 11/1986 | Lastuck |
| D296,509 | S | | 7/1988 | Fuke |
| D335,240 | S | | 5/1993 | Critchfield et al. |
| D366,390 | S | | 1/1996 | Vitantonio |
| D409,041 | S | | 5/1999 | Barker |
| D412,808 | S | | 8/1999 | Hinton et al. |
| 6,016,741 | A | | 1/2000 | Tsai et al. |
| D431,152 | S | | 9/2000 | Lee |
| D436,796 | S | | 1/2001 | Kalina et al. |
| 6,186,055 | B1 | | 2/2001 | DeMars et al. |
| D441,250 | S | | 5/2001 | Choi |
| 6,472,644 | B1 | | 10/2002 | Wu |
| D484,737 | S | | 1/2004 | Bodum |
| D505,044 | S | | 5/2005 | Hei |

(Continued)

OTHER PUBLICATIONS

Presto® 20-inch Cool Touch Electric Griddle, webpage, http://www.gopresto.com/products/products.php?stock=07030, Nov. 7, 2011, 2 pages.

(Continued)

*Primary Examiner* — Steven Leff
(74) *Attorney, Agent, or Firm* — Patterson Thuente Pedersen, P.A.

(57) ABSTRACT

A countertop griddle and related methods of cooking food with a countertop griddle including a warming tray. The warming tray can be rotatably attached to the countertop griddle such that the warming tray can be rotatably pivoted from a covering disposition to an intermediary disposition to an open disposition. When in the covering disposition, the warming tray can serve to protect a user from exposure to grease spatter and to receive heat conducted from a cooking surface. During cooking, the warming tray can be rotated to the intermediary disposition such that the user can manipulated the food item being prepared. Finally, the warming tray can be rotated to an open disposition defining a serving tray for receiving a cooked food item. The warming tray can be detached from the countertop griddle when the warming tray is positioned in any of the covering, intermediate or open dispositions.

14 Claims, 14 Drawing Sheets

(56) References Cited

U.S. PATENT DOCUMENTS

| | | |
|---|---|---|
| D533,016 S | 12/2006 | Genslak et al. |
| D575,098 S | 8/2008 | Seymour |
| 7,523,697 B2 | 4/2009 | Hedrington |
| D618,047 S | 6/2010 | Seymour |
| D644,867 S | 9/2011 | Janvier |
| D658,429 S | 5/2012 | Berge |
| D674,656 S | 1/2013 | Berge et al. |
| 2006/0163242 A1 | 7/2006 | Ciancimino et al. |

OTHER PUBLICATIONS

Presto® 22-inch Electric Griddle, webpage, http://www.gopresto.com/products/products.php?stock=07039, Nov. 7, 2011, 2 pages.

Presto® 22-inch Electric Griddle with Removable Handles, webpage, http://www.gopresto.com/products/products.php?stock=07061, Nov. 7, 2011, 2 pages.

Presto® Cool Touch Electric Griddle, webpage, http://www.gopresto.com/products/products.php?stock=07047, Nov. 7, 2011, 2 pages.

Presto® Cool Touch Electric Foldaway™ Griddle, webpage, http://www.gopresto.com/products/products.php?stock=07050, Nov. 7, 2011, 2 pages.

Presto® Cool Touch Electric Tilt'nDrain™ Griddle, webpage, http://www.gopresto.com/products/products.php?stock=07045, Nov. 7, 2011, 2 pages.

Presto® Liddle Griddle® mini griddle, webpage, http://www.gopresto.com/products/products.php?stock=07211, Nov. 7, 2011, 2 pages.

Presto® Tilt'nDrain™ BigGriddle cool touch electric griddle, webpage, http://www.gopresto.com/products/products.php?stock=07046, Nov. 7, 2011, 3 pages.

APW Wyott 23780 7 Qt. Notched/Hinged Stainless Steel Inset Cover, webpage, http://www.webstaurantstore.com/apw-wyott-23780-7-qt-notched-hinged-stainless-steel-inset-cover/13523780.html, printed Feb. 2, 2012, 2 pages.

Oster 12-inch Skillet with Hinged Lid, webpage, http://www.oster.com/ProductDetails.aspx?pid=1625, printed Feb. 7, 2012, 1 page.

\* cited by examiner

GRIDDLE HAVING ATTACHED WARMING PLATE

FIELD OF THE INVENTION

The present invention relates generally to countertop griddles. More specifically, the present invention is directed to a countertop griddle including a hinged warming plate so as to provide increased functionality to a user.

BACKGROUND OF THE INVENTION

Countertop griddles are a well known consumer appliance and provide users with a convenient easy to clean cooking surface. Countertop griddles are frequently used when preparing breakfast items such as, for example, pancakes, French toast, bacon, sausage and various preparations of eggs. Oftentimes, more than one type of food is being prepared simultaneously. In addition, items such as, for example, bacon may splatter during preparation, thus causing a user to contact hot grease. As such, it would be advantageous if conventional countertop griddles were improved to deal with situations in which multiple food items are being simultaneously prepared or to prevent exposure to splattered grease.

SUMMARY OF THE INVENTION

A countertop griddle of the present invention provides additional function to the act of cooking food items by including an attached warming tray. The warming tray can be rotatably attached to the countertop griddle such that the warming tray can be rotatably pivoted from a covering disposition to an intermediary disposition to an open disposition. The warming tray can include mounting arms that interface with a spring member mounted within receiving channels on the countertop griddle to effectively lock the warming tray in either the covering disposition, intermediary disposition or open disposition. When in the covering disposition, the warming tray can serve to protect a user from exposure to grease spatter. In addition, the covering disposition positions the warming tray to receive heat conducted from a cooking surface of the countertop griddle. During cooking, the warming tray can be rotated to the intermediary disposition such that the user can manipulate the food item being prepared. Finally, the warming tray can be rotated to an open disposition defining a serving tray for receiving a cooked food item. The serving tray is generally preheated from convection when the warming tray is in the covering disposition and through conduction when the warming tray is in the open disposition such that serving tray helps to maintain the temperature of the cooked food item. The warming tray can be selectively attached or removed from the countertop griddle when the warming tray is oriented to be in the covering disposition, intermediary disposition or open disposition.

In one aspect of the present invention, a countertop griddle can comprise a griddle body and having a cooking surface with a warming tray attached to the griddle body. The warming tray can be rotatably attached to the griddle body such that the warming tray is rotatably positionable between a covering disposition, an intermediary disposition and an open disposition. The warming tray can include mounting arms that interface with spring members mounted within receiving channels on the griddle body to effectively lock the warming tray in either the covering disposition, intermediary disposition or open disposition. With the warming tray in the covering disposition, the warming tray is positioned above at least a portion of the cooking surface such that the warming tray can prevent a user from being exposed to grease splatter by food items that are covered by the warming tray while being cooked on the cooking surface. At the same time, the warming tray is receiving heat energy convected from the cooking surface. During cooking of the food items, the warming tray can be rotated to an intermediary disposition such that a user can manipulate the food items being cooked, for example, flipping or rolling of the food items, to facilitate fully cooking the food items and preventing burning of the food items. Following cooking of food items, the warming tray can be rotatably positioned in an open disposition such that the warming tray substantially defines a serving tray. The warming tray is heated by conduction from the cooking surface when in the open disposition. The warming tray can be selectively attached or removed from the griddle body when the warming tray is oriented in either the covering disposition, intermediary disposition or open disposition.

In another aspect of the present invention, the present invention can be directed to a method of serving cooked food. Generally, the method can comprise placing a food item to be cooked on a cooking surface of a countertop griddle. Next, a warming plate can be positioned above at least a portion of the countertop griddle, wherein the warming plate is attached to the countertop griddle. Next, the warming plate can be heated by energy convected from the cooking surface while the warming plate is positioned above at the countertop griddle. Finally, the warming plate can be positioned to define a serving tray for receiving a cooked food item with the warming plate attached to the countertop griddle. The serving tray can be heated by energy conducted from the cooking surface. The warming plate can be rotatably attached to the countertop griddle such that the warming plate is rotatably movable between a covering disposition covering at least a portion of the countertop griddle and an open disposition defining the serving tray. The method can further comprise cooking at least one food item underneath the warming plate in the covering disposition such that warming plate protects a user from grease splatter.

In yet another aspect of the present invention, the present invention can be directed to a method of preparing cooked food. Generally, the method can comprise placing a food item to be cooked on a cooking surface of a countertop griddle. Next a warming plate can be positioned above the food item, wherein the warming plate is attached to the countertop griddle. The method can further comprise blocking grease splatter from the food item with the warming plate as the food item is cooking on the cooking surface. The warming plate can be rotatably attached to the countertop griddle such that the warming plates can be rotatably positioned in a covering disposition such that the warming plate covers at least a portion of the cooking surface. The method can further comprises rotating the warming plate to an intermediary disposition such that the user can manipulate the food item on the cooking surface, for example, flipping or rolling the food item so as to thoroughly cook the food item and prevent burning of the food item. The method can further comprise rotating the warming plate to an open disposition such that the warming plate defines a serving tray for receiving a cooked food item. Finally, the method can comprise heating the warming plate with heat energy convected from the cooking surface when the warming plate is in the covering disposition. The method can further comprise heating the warming plate with energy conducted from the cooking surface when the warming plate is in the open disposition.

The above summary of the various representative embodiments of the invention is not intended to describe each illustrated embodiment or every implementation of the invention.

Rather, the embodiments are chosen and described so that others skilled in the art can appreciate and understand the principles and practices of the invention. The figures in the detailed description that follow more particularly exemplify these embodiments.

BRIEF DESCRIPTION OF THE DRAWINGS

The invention can be more completely understood in consideration of the following detailed description of various embodiments of the invention in connection with the accompanying drawings, in which.

Figure 1:
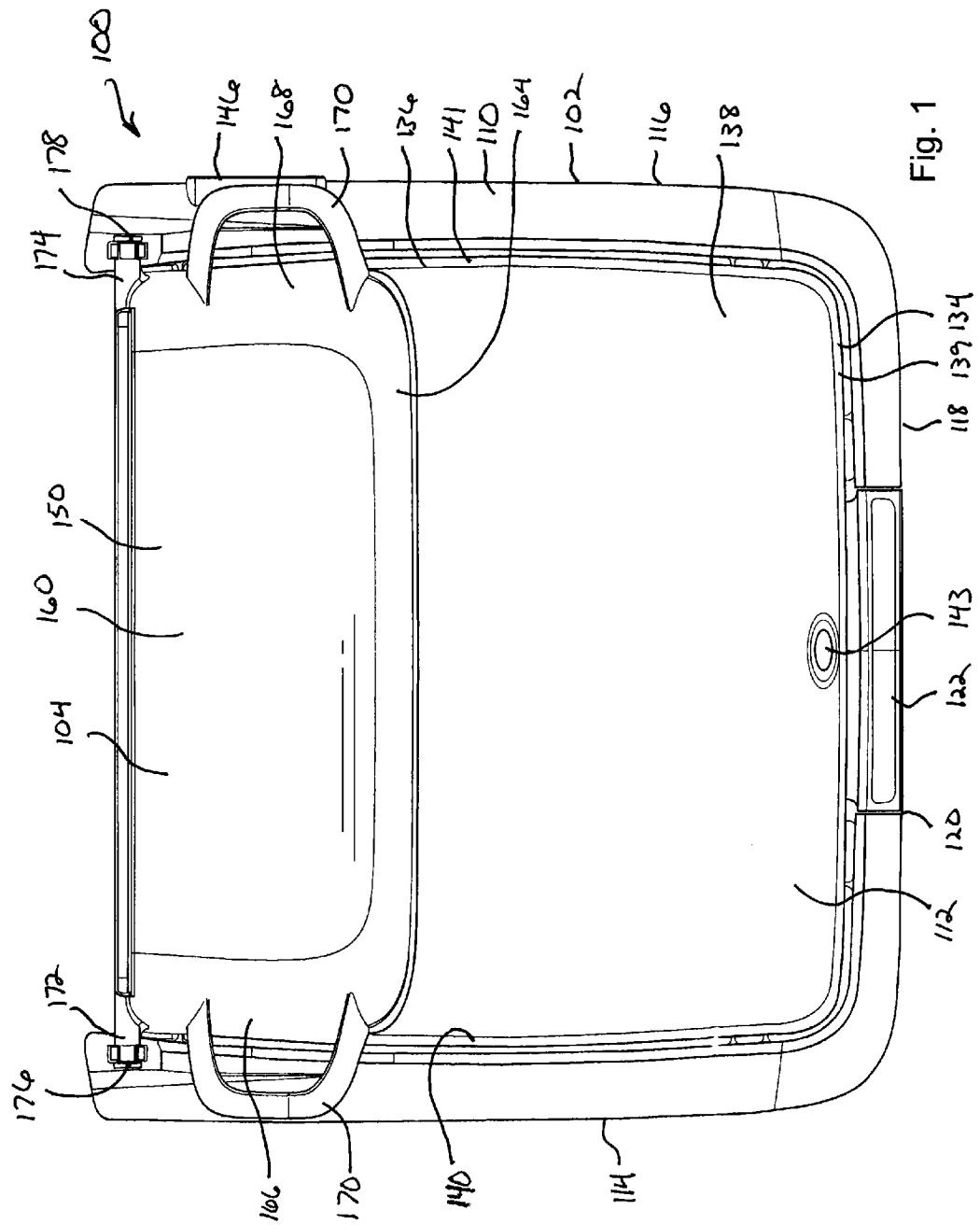
FIG. 1 is a top view of a griddle according to an embodiment of the present invention with a warming tray arranged in a covering disposition.
Figure 2:
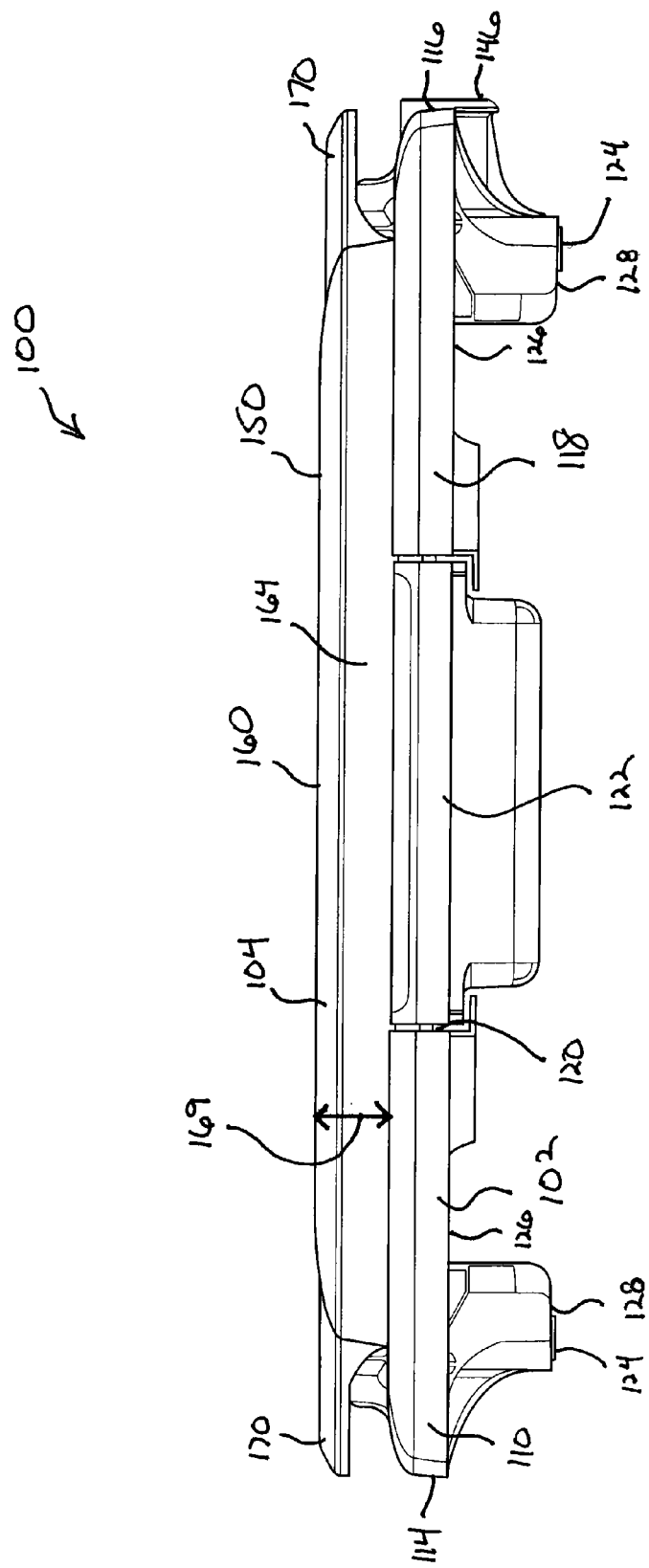
FIG. 2 is a front view of the griddle of FIG. 1.
Figure 3:
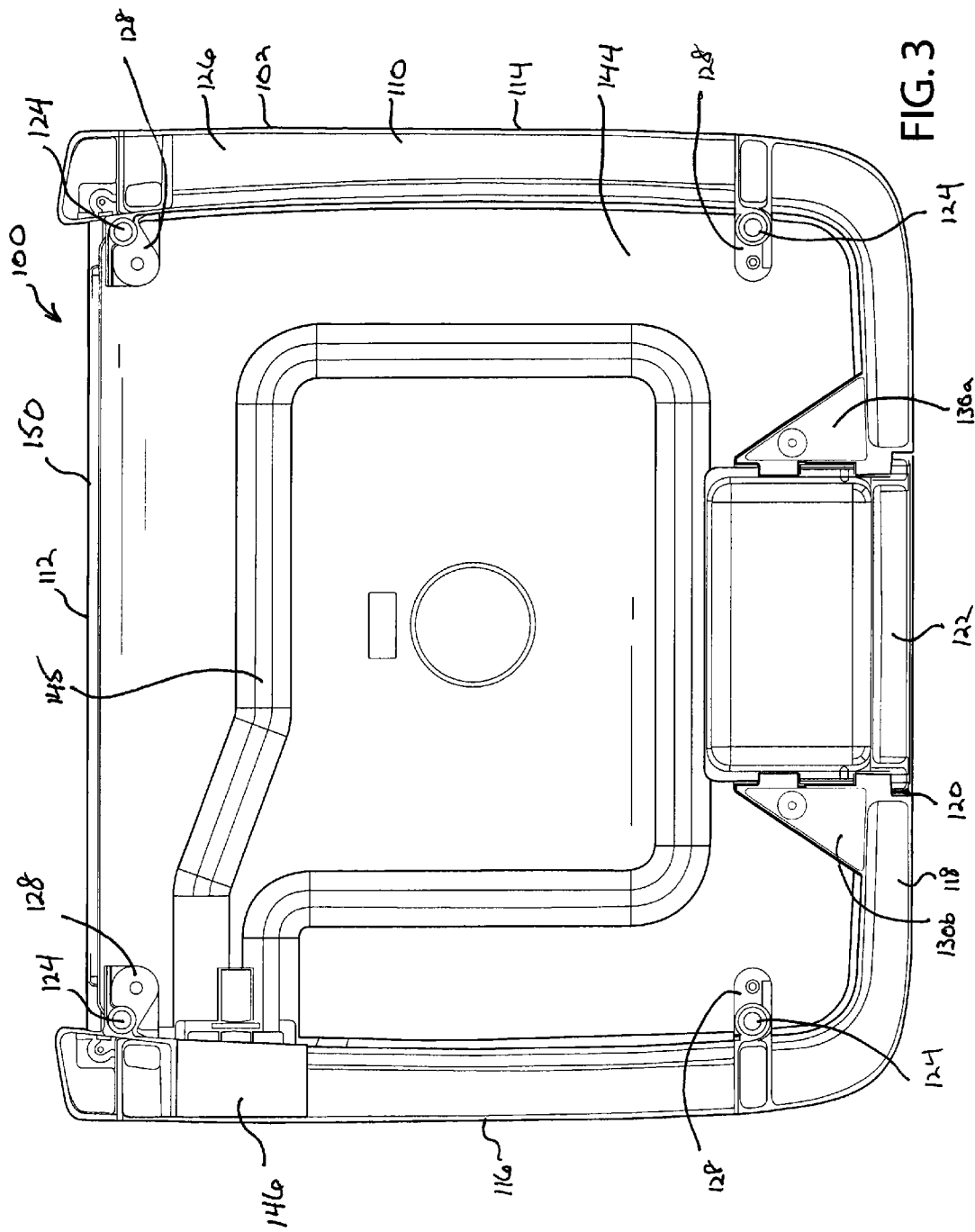
FIG. 3 is a bottom view of the griddle of FIG. 1.
Figure 4:
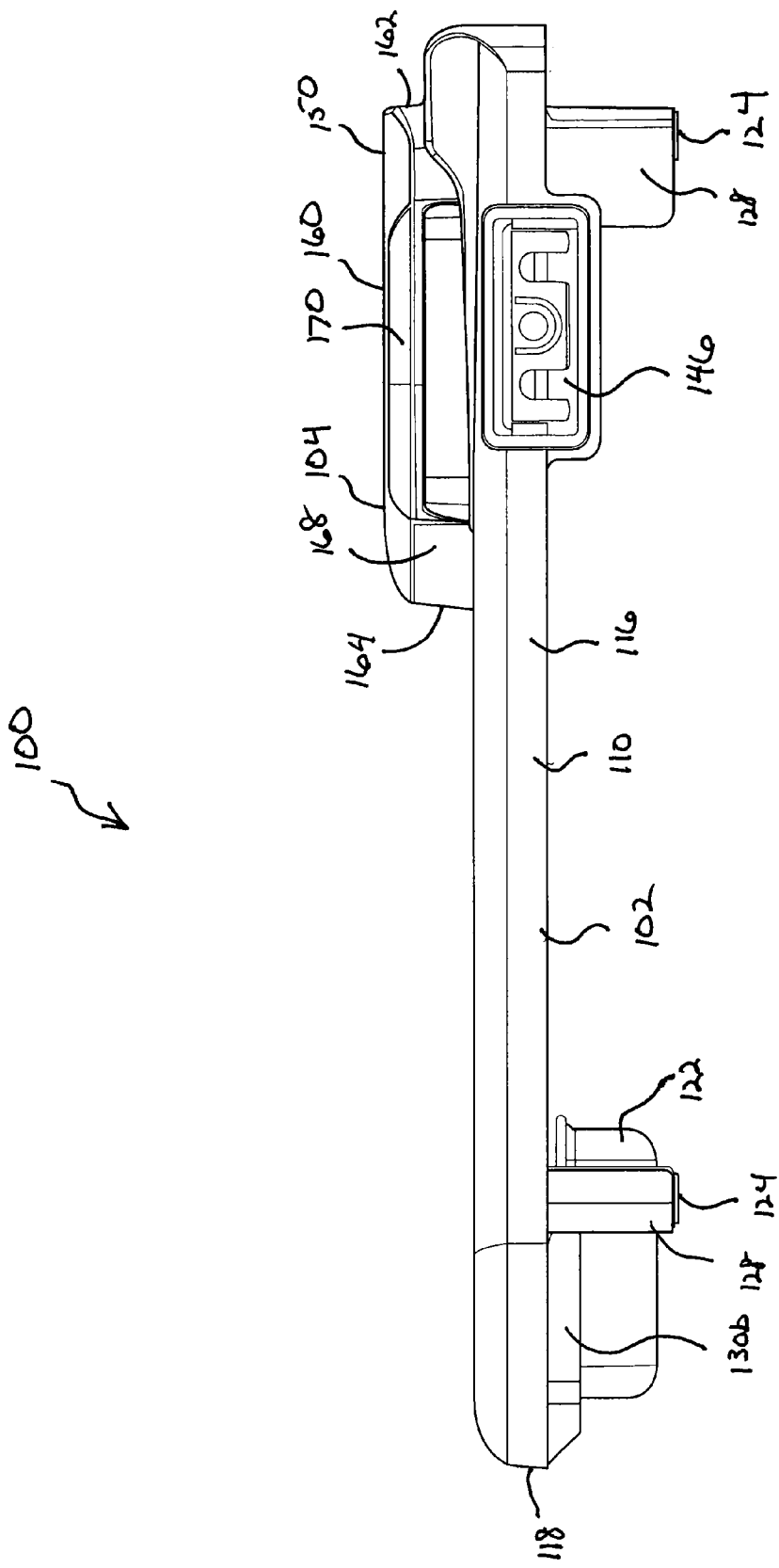
FIG. 4 is a right side view of the griddle of FIG. 1.
Figure 5:
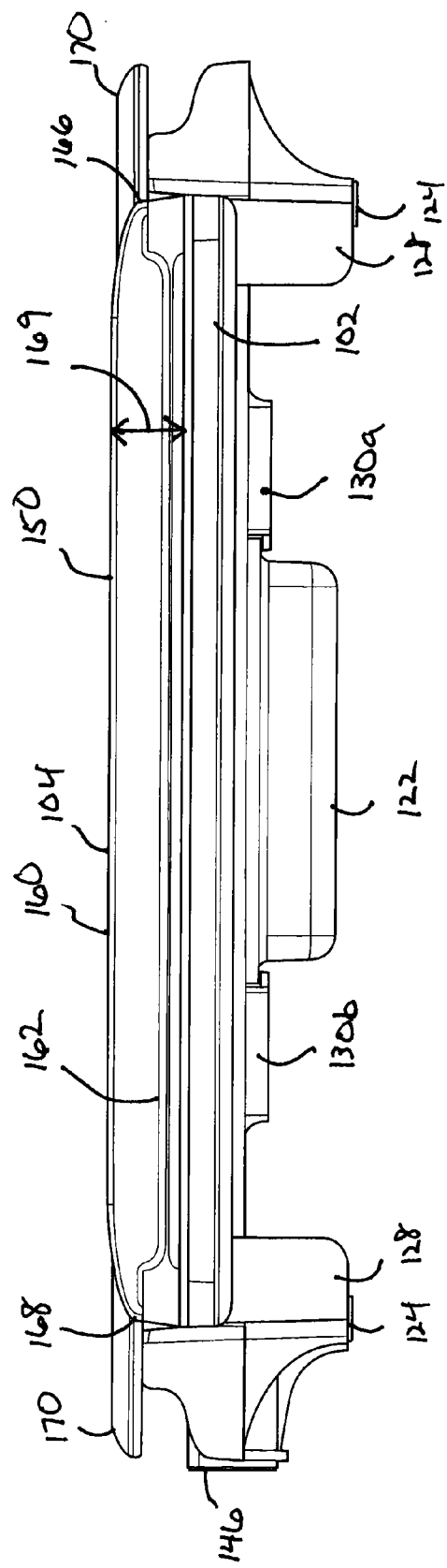
FIG. 5 is a rear view of the griddle of FIG. 1.
Figure 6:
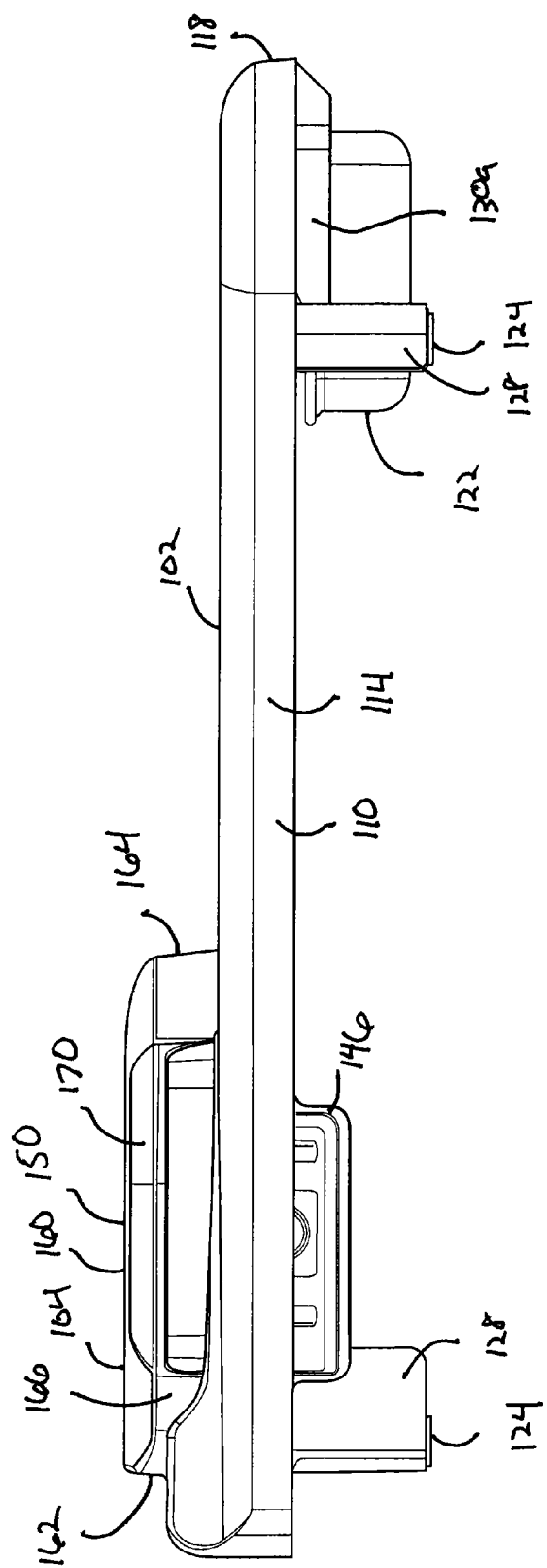
FIG. 6 is a left side view of the griddle of FIG. 1.

While the invention is amenable to various modifications and alternative forms, specifics thereof have been shown by way of example in the drawings and will be described in detail. It should be understood, however, that the intention is not to limit the invention to the particular embodiments as described. On the contrary, the intention is to cover all modifications, equivalents, and alternatives falling within the spirit and scope of the invention as defined by the appended claims.

DETAILED DESCRIPTION OF THE DRAWINGS

Referring generally to FIGS. 1-9, a countertop griddle 100 of the present invention generally comprises a griddle body 102 and a warming plate 104. Countertop griddle 100 can be fabricated of materials suited for food contact and capable of withstanding elevated temperatures.

As seen in FIGS. 1-9, griddle body 102 generally comprises an unheated perimeter portion 110 and a cooking surface 112. Unheated perimeter portion 110 is generally fabricated of non or low conducting materials such that a user can handle the countertop griddle 100 without fear of being burned. Unheated perimeter portion 110 can be fabricated of suitable polymeric materials such as, for example, nylon, polyester resin, phenolic resin and the like. Cooking surface 112 is generally fabricated of typical cooking surface materials such as, for example, aluminum, stainless steel and the like and can be treated or include coatings to provide non-stick qualities. Perimeter portion 110 generally includes a left side wall 114, a right side wall 116 and a front wall 118. Front wall 118 can include a gap 120 for slidably mounting a removable drip tray 122. Feet 124 are attached to a bottom perimeter surface 126 at front and rear locations of the left side wall 114 and right side wall 116. Feet 124 can further include an internal support portion 128. Bottom perimeter surface 126 can include a pair of slide brackets 130a, 130b for slidably accommodating the removable drip tray 122. Feet 124 are attached at both front and rear locations of the left side wall 114 and right side wall 116.

As best illustrated in FIGS. 1, 3, 7-9 and 14, cooking surface 112 generally includes a raised lip 134 that fully surrounds a cooking perimeter 136 of an upper surface 138. Raised lip 134 generally defines an upwardly facing front lip 139, an upwardly facing left lip 140, an upwardly facing right lip 141 and an upwardly facing rear lip 142. An aperture 143 is located in the cooking surface 112 proximate the front lip 140 and extends from the upper surface 138 to a bottom surface 144. Upper surface 138 preferably includes a non-stick coating such that food being cooked does not stick to the cooking surface 112 and to facilitate easy cleaning of the cooking surface 112. A resistive heating element 145 is mounted to the bottom surface 144 such that heat energy is conducted through the cooking surface 112 for cooking food on the upper surface 138. Resistive heating element 145 is operably connected to an electrical receptacle 146 wherein a power cord can be connected such that electrical energy is supplied to the resistive heating element 145.

Figure 7:
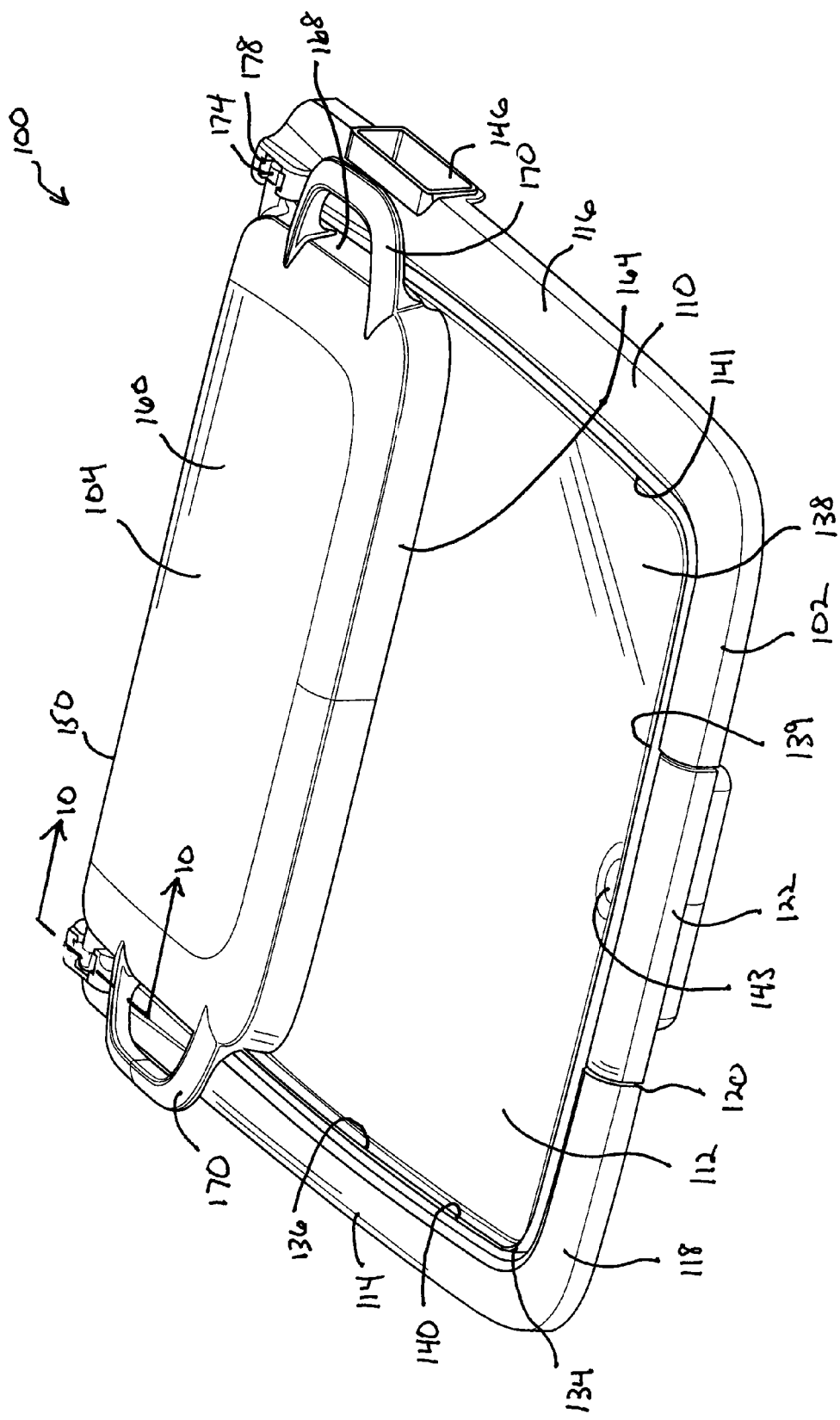
FIG. 7 is a perspective, top view of the griddle of FIG. 1.
Figure 8:
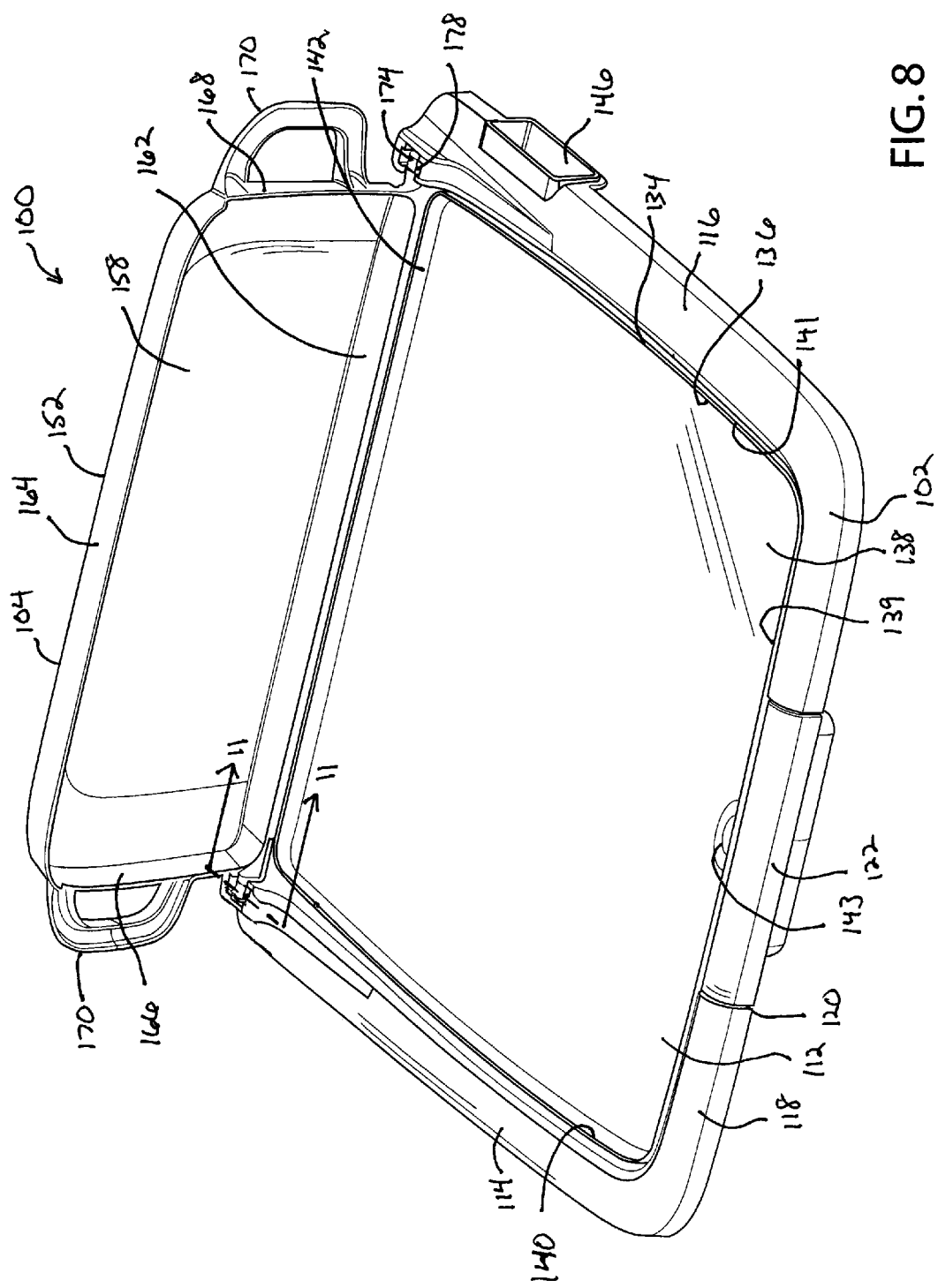
FIG. 8 is a perspective, top view of the griddle of FIG. 1 with the warming tray arranged in an intermediary disposition.
Figure 9:
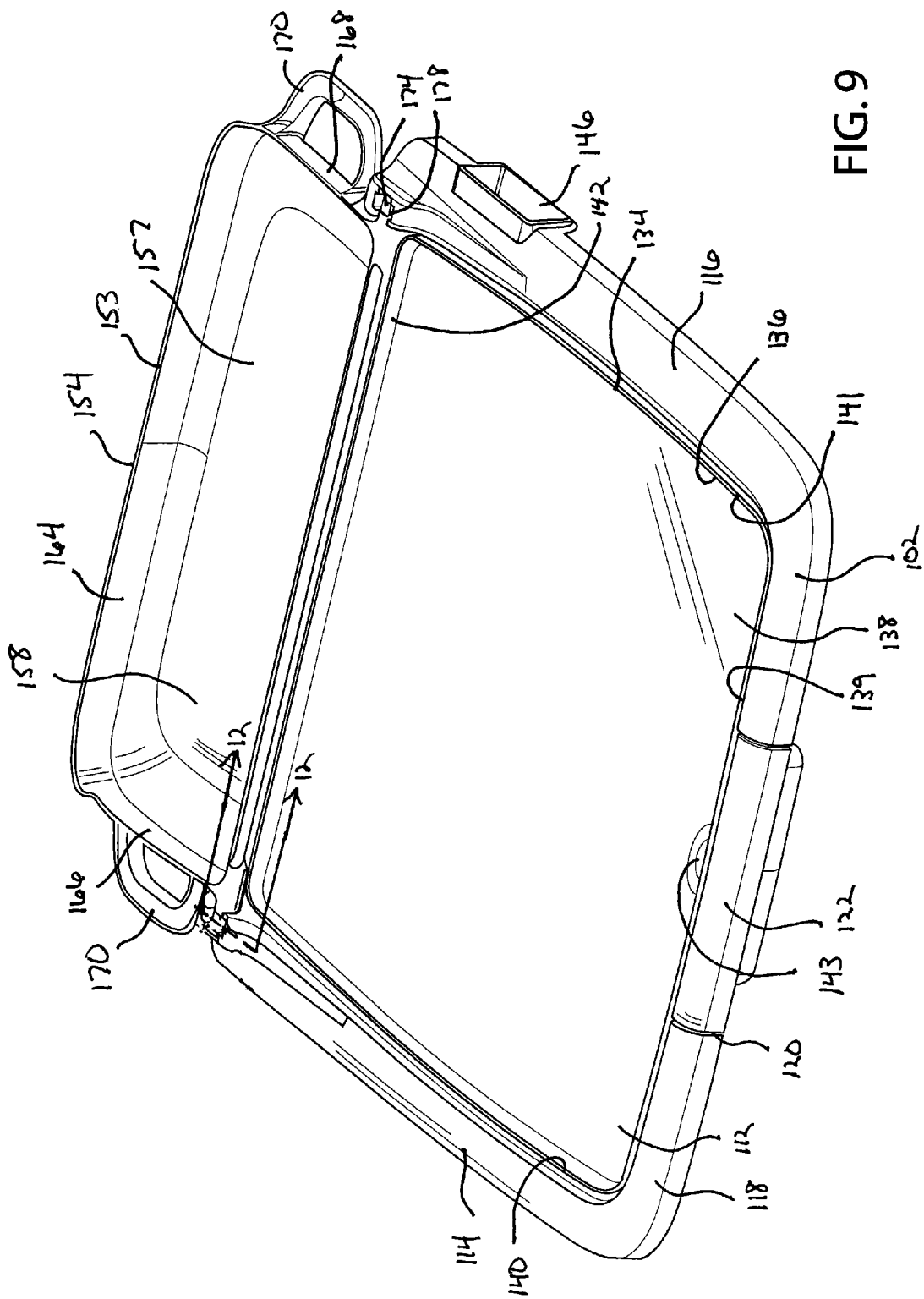
FIG. 9 is a perspective, top view of the griddle of FIG. 1 with the warming tray arranged in an open disposition.

As seen in FIGS. 1, 2 and 4-9, warming plate 104 is generally rotatably mounted to the griddle body 102 such that the warming plate 104 can be rotated between a covering disposition 150 as shown in FIG. 7, an intermediary disposition 152 as shown in FIG. 8 and an open disposition 154 as shown in FIG. 9. As illustrated in FIG. 9, warming pate 104 substantially resembles a serving tray 153. As described below, the description of warming plate 104 and the terms front, rear, top and bottom generally refer to the open disposition 154 as shown in FIG. 9. Warming plate 104 can be constructed of appropriate materials for food contact and that can stand up to temperatures conducted from the cooking surface 112. Representative materials can include polymers such as, for example, nylon, bulk molding compound and the like or metals such as, for example, aluminum, stainless steel and the like. In addition, warming plate 104 can include surface treatments or coatings to provide non-stick functions to the warming plate 104. Serving tray 153 generally comprises a tray surface 157 defined by an upper tray surface 158 and a bottom tray surface 160. Serving tray 153 is further defined by a front tray wall 162, a rear tray wall 164, a left tray wall 166 and a right tray wall 168. Front tray wall 162, rear tray wall 164, left tray wall 166 and right tray wall 168 generally define a tray wall height 169 of between about 0.5 inches to about 3.0 inches. The left tray wall 166 and right tray wall 168 each include a tray handle 170.

Referring generally to FIGS. 10-14, warming plate 104 is removably attached to the griddle body 102 through the interaction of a pair of mounting arms 172, 174 and a corresponding pair of receiving channels 176, 178. Mounting arms 172, 174 are integral to the warming plate 104 and extend outwardly from the front tray wall 162 proximate the intersections with the left tray wall 166 and right tray wall 168 respectively. Each mounting arm 172, 174 includes an arm body 179 having a mounting end portion 180. Arm body 179 generally has a circular cross-section 181 while the mounting end portion 180 has end walls 183 defining a generally square cross-section 182. Mounting end portion 180 defines a mounting end width 177 between parallel sides of the square cross-section 182. Receiving channels 176, 178 are located on the left side wall 114 and right side wall 116 respectively of the griddle body 102. Receiving channels 176, 178 each define a generally arcuate channel portion 184 and a generally rectangular channel portion 185. Mounted within the rectangular channel portion 185 of each receiving channel 176, 178 is a spring member 186. Spring member 186 is generally defined by a first end 187 and a second end 188. Spring member 186 is formed so as to define a pair of parallel inner sections 192, 194 and a pair of parallel outer sections 196, 198 connected by a bottom section 200. Between the corresponding parallel inner sections 192, 194 and parallel outer sections 196, 198 are a pair of curved transition sections 201, 202. Generally, the spring member 186 has an outside width 204 measured between the pair of parallel outer sections 196, 198 and an inside width 206 measured between the pair of parallel inner sections 192, 194. Outside width 204 is generally selected such that spring member 186 mounts snugly within the rectangular channel portions 185 of each receiving channel 176, 178 with the parallel outer sections 196, 198 and bottom section 200 in contact with the walls defining the rectangular channel portion 185. Inside width 206 is generally selected to be equivalent to a distance between opposing end walls 183 of the mounting end portion 180. Spring member 186 can be fixedly retained within the receiving channel 176, 178 using a suitable fastener, for example, a screw 208 that attaches and retains the spring member 186 to the griddle body 102.

Figure 10:
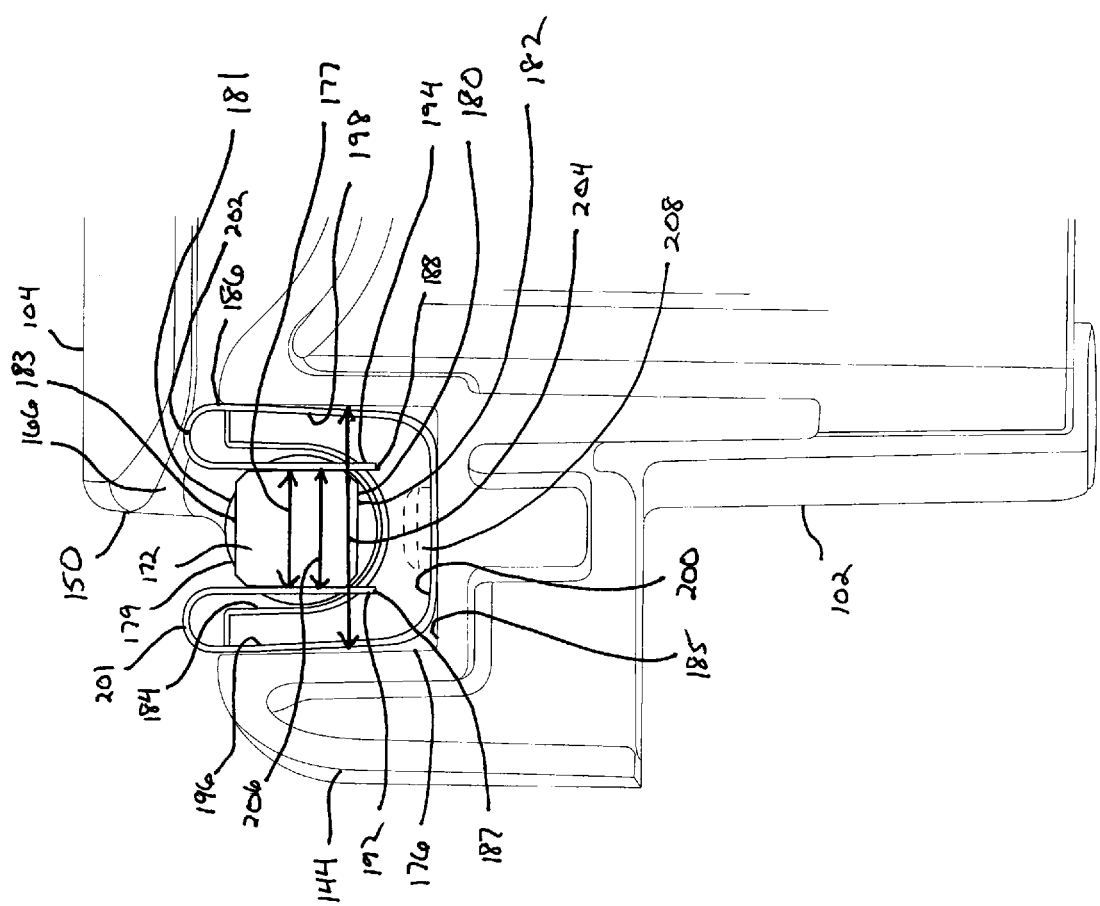
FIG. 10 is a section view of the griddle of FIG. 1 in a covering disposition as taken at line 10-10 of FIG. 7.
Figure 11:
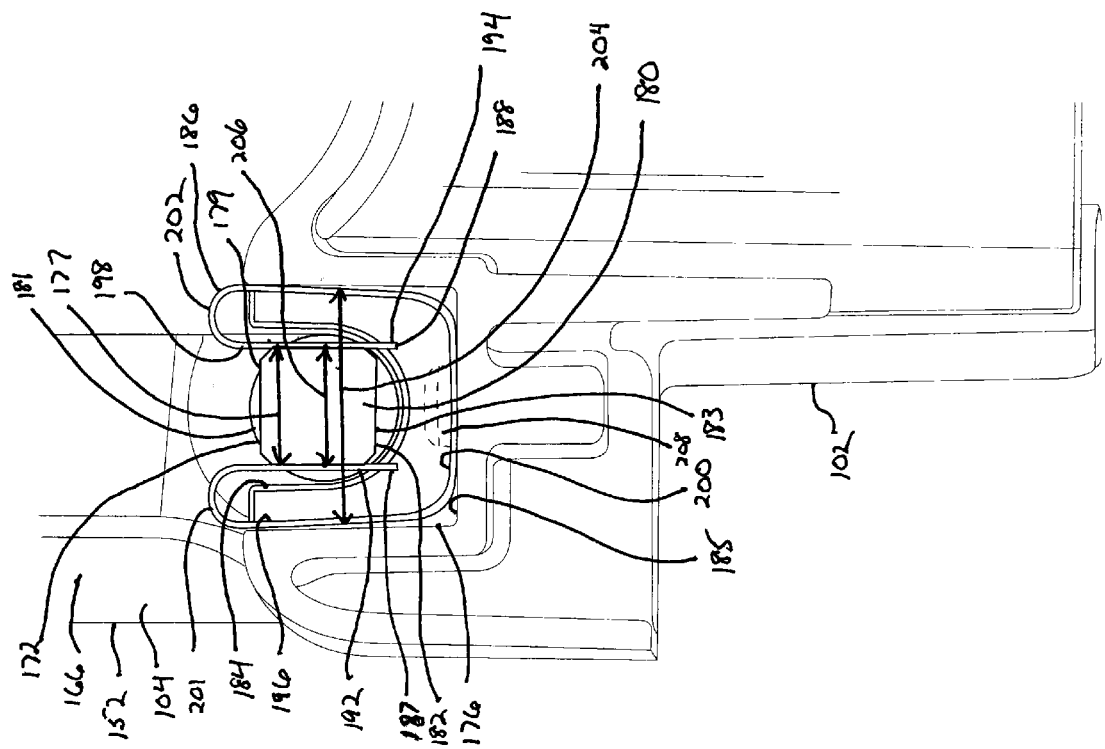
FIG. 11 is a section view of the griddle of FIG. 1 in an intermediary disposition as taken at line 11-11 of FIG. 8.
Figure 12:
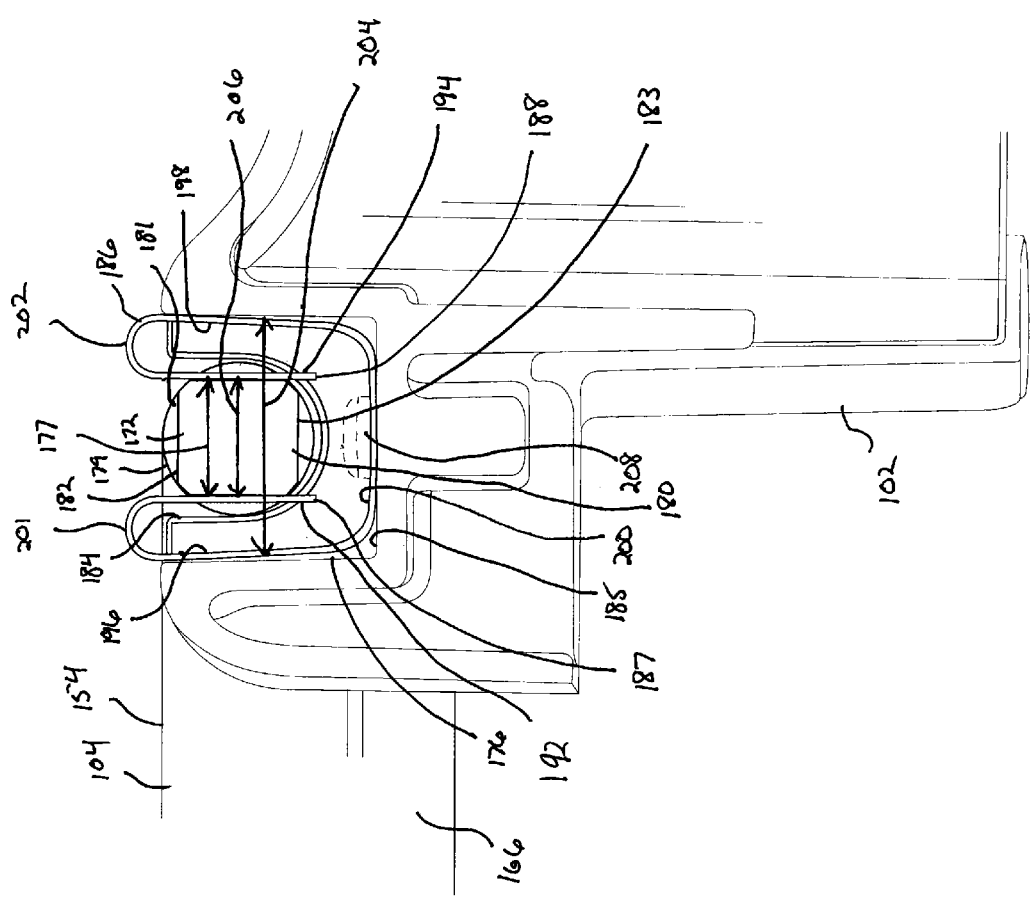
FIG. 12 is a section view of the griddle of FIG. 1 in an open disposition as taken at line 12-12 of FIG. 9.
Figure 13:
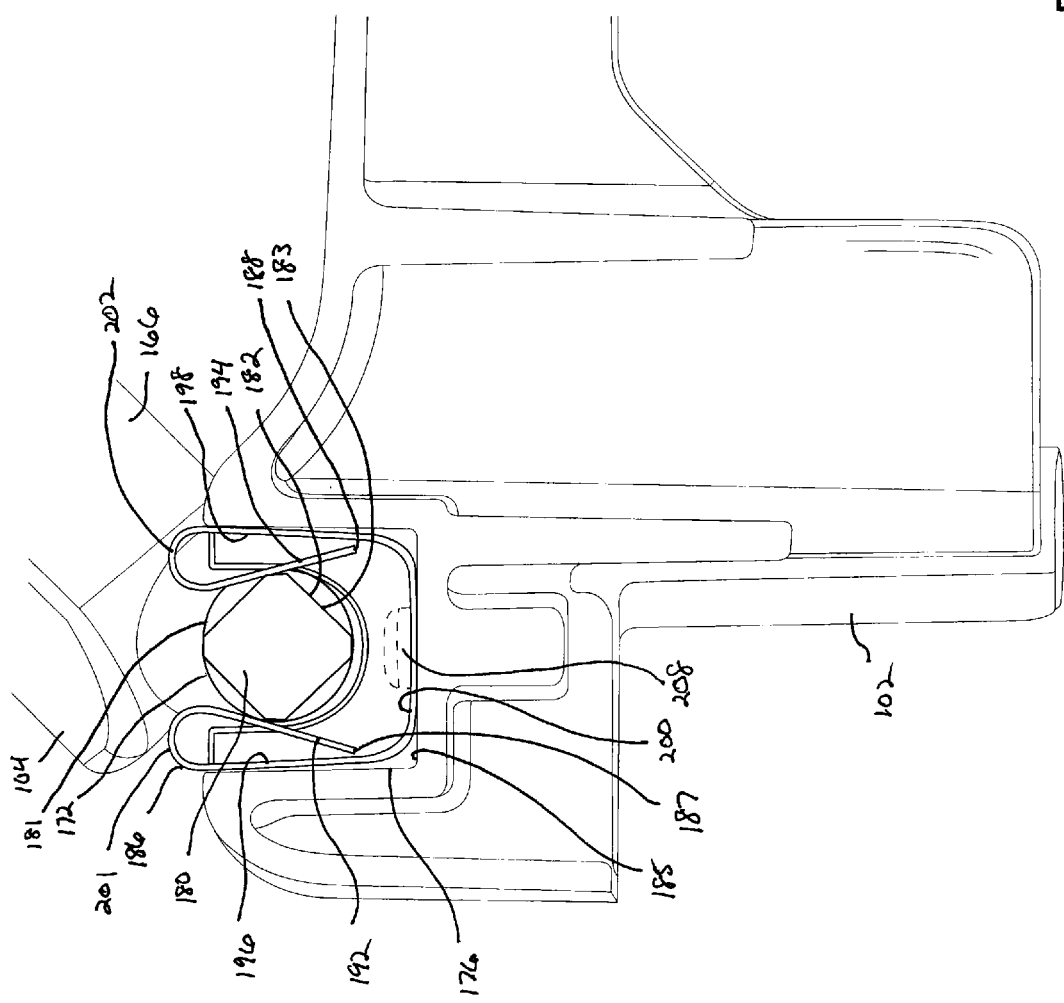
FIG. 13 is a section of the griddle of FIG. 1 illustrating a locking interaction between a mounting arm and a spring member.
Figure 14:
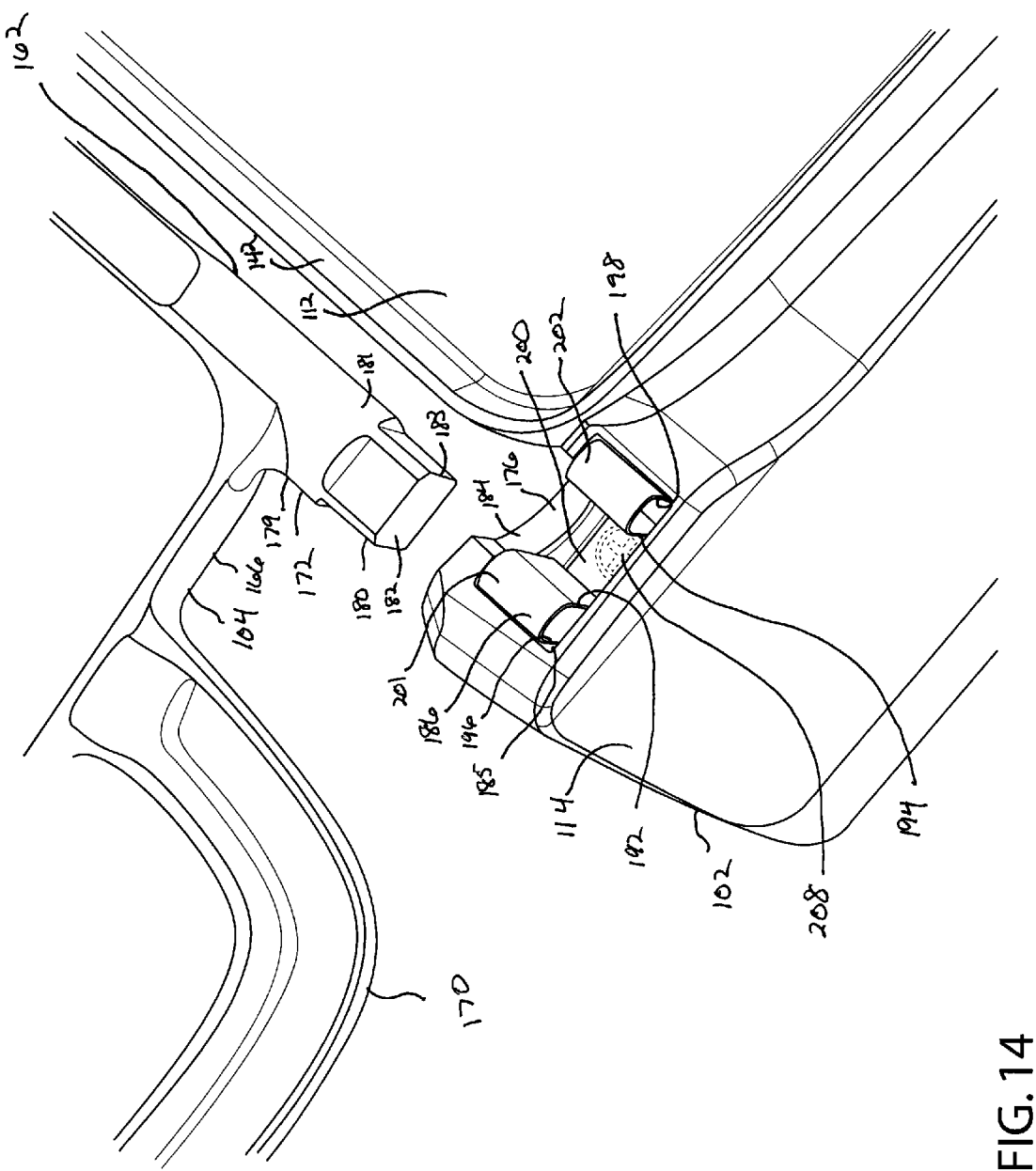
FIG. 14 is an exploded, perspective view of the griddle of FIG. 1 illustrating a mounting arm arranged for attachment to or detachment from of a warming plate to a griddle body.

Through the interaction of the mounting arms 172, 174, receiving channels 176, 178 and spring members 186, warming plate 104 can be selectively attached and detached when warming plate 104 is arranged in the covering disposition 150, intermediary disposition 152 or open disposition 154. As illustrated in FIGS. 10, 11 and 12, when warming plate 104 is positioned in either the covering disposition 150, intermediary disposition 152 or open disposition 154, the generally square cross-section 182 of the mounting end portion 180 causes the vertically oriented end walls 183 to be generally parallel to the parallel inner sections 192, 194. This is best illustrated in FIG. 14 illustrating attachment of warming plate 104 to griddle body 102 in open disposition 154. As the inside width 206 is generally equal to the distance between the vertically oriented end walls 183 or mounting end width 177, the warming plate 104 is attached or removed by simply pressing the mounting end portions 180 into the receiving channels 176, 178 or alternatively, pulling the mounting end portions 180 from the receiving channels 176, 178. As can be seen in FIG. 13, orienting the warming plate 104 in a position other than the covering disposition 150, intermediary disposition 152 or open disposition 154 causes the end walls 183 to be arranged in a non-parallel orientation with respect to the parallel inner sections 192, 194. The corners defined by the square cross-section 182 define a width greater than mounting end width 177 and correspondingly, the inside width 206. When the warming plate 104 is attached to the griddle body 102 and oriented as shown in FIG. 13, the mounting end portion 180 presses the parallel inner sections 192, 194 toward the parallel outer sections 196, 198. When the mounting end portion 180 is arranged as shown in FIG. 13, the warming plate 104 cannot be removed as the width between the corners exceeds the inside width 206 as defined between the curved transition sections 201, 202. Similarly, if warming plate 104 is not previously attached to the griddle body 102, the mounting arms 172, 174 cannot be advanced into the receiving channels 176, 178 when the mounting end portions 180 are oriented as illustrated with respect to the spring members 186. While the warming plate 104 can be selectively attached or detached from the griddle body 102 when the warming plate 104 is arranged in either the covering disposition 150, intermediary disposition 152 or open disposition 154, these dispositions also provide a locking function that will hold the warming plate 104 in the desired disposition absent additional force being applied by a user due to the interaction of the end walls 183 with the parallel inner sections 192, 194.

In use during cooking, countertop griddle 100 can be initially utilized in a similar manner as conventional griddles. Generally, a power cord including a temperature control can be plugged into the electrical receptacle 146. With power supplied to the resistive heating element 145, the resistive heating element 145 begins heating bottom surface 144 such that heat is conducted through the cooking surface 112 until upper surface 138 reaches a desired cooking temperature. With the upper surface 138 heated to a desired temperature, food items such as, for example, breakfast foods such as eggs, bacon and/or sausage can be placed onto the upper surface 138 for cooking. During cooking of the food items, raised lip 134 prevents food items such as sausage links from rolling off the upper surface 138 or liquid eggs from dripping off the upper surface 138. In addition, aperture 143 allows for liquid grease from food items such as bacon or sausage to drip into the removable drip tray 122. Following cooking of the food items, removable drip tray 122 can be slidably removed from the slide brackets 130a, 130b such that grease can be discarded and to facilitate cleaning of the removable drip tray 122.

Whereas countertop griddle 100 initially operates similarly to convention griddles, the inclusion of warming plate 104 provides additional convenience and functionality related to cooking performance, operator safety and serving convenience. Generally, warming plate 104 can initially attached to the griddle body 102 in any of covering disposition 150, intermediary disposition 152 or open disposition 154 as previously described. In situations where the warming plate 104 will be utilized to hold and serve food following cooking, it can be advantageous to initially attach the warming plate 104 in open disposition 150. In open disposition 150, upwardly facing rear lip 142 is in direct physical contact with the front tray wall 142 such that tray 153 is heated with heat energy conducted from the upwardly facing rear lip 142 through the front tray wall 162. It should be noted that increasing the amount of food positioned in the tray 153 will increase the pressure applied by the front tray wall 162 to the upwardly facing rear lip 142 which will further increase the amount of heat conducted to the warming plate 104. When in the open disposition 154, warming plate 104 can be supported above a surface that the feet 124 are residing on, for example, a countertop or table, such that the bottom tray surface 160, which can be at an elevated temperature, is supported above the countertop or table and does not directly contact the countertop or table which could lead to potential damage.

Alternatively, if warming plate 104 will be utilized to cover food items during cooking of the food items, it can be advantageous to place the warming plate 104 in either the intermediary disposition 152 or open disposition 154 such that the food items can be positioned on the cooking surface 112 proximate the upwardly facing rear lip 142 as the food items to be cooked are placed on the cooking surface 112. In this manner, warming plate 104 can be subsequently rotated to the covering disposition 150 to cover the food items located a rear portion of the upper surface 138 during cooking. During cooking of food items that are covered by the warming plate 104, a user can grasp one or both of the tray handles 170 to rotate the warming plate 104 to the intermediary disposition 152. In this manner, the user can access the food items previously covered by the warming plate 104 such that the food items can be manipulated by flipping, i.e. bacon or sausage patties, or rolled, i.e. sausage links for thorough cooking and to prevent burning. Tray handles 170 are preferably manufactured of a generally non-conductive material, such as, for example, ceramic or polymeric materials, such that the user can easily grasp the handle 170 and manipulate the heated warming plate 104 without risk of burning or discomfort.

When warming plate 104 is positioned in the covering disposition 150 during heating of the cooking surface 112, serving tray 153 is heated by convection of heat energy from the upper surface 138. At the same time that serving tray 153 is being heated, warming plate 104 can be functioning as a spatter shield for items that can spray or spurt grease during cooking such as, for example, bacon or sausage. In addition, warming plate 104 can act as a steam cover or for the application of quick heat, for example, melting cheese on a cheeseburger, when the warming plate 104 is arranged in the covering disposition 150. With warming plate 104 arranged in the covering disposition 150, a user can manipulate food items, such as, for example, stirring scrambled eggs, frying hamburgers or flipping French toast or pancakes, on a portion of the upper surface 138 proximate the upwardly facing front lip 139 that is not covered by the warming plate 104. As the user manipulates the food items proximate the upwardly facing front lip 139, any grease spraying or spurting from the food items covered by the warming plate 104 is blocked and prevented from coming into contact with the user. In addition to functioning as a splatter shield when in the covering disposition 150, the warming plate 104 can also act as a spatter shield when in intermediate disposition 152 to protect walls or other items located adjacent the upwardly facing rear lip 142.

Following cooking of the food items, either on portions of the upper surface 138 covered or not covered by the warming plate 104, the warming plate 104 can be rotated to the open disposition 154. With the warming plate 104 rotated to open disposition 154, any food items previously cooked on the cooking surface 112 can be removed from the upper surface 138 and placed into the tray 153. Due to the heat previously convected from the cooking surface 112 to the serving tray 153, serving tray 153 is already warm such that food items placed in serving tray 153 are kept warm prior to and/or during serving. In addition, warming plate 104 will be heated directly by conduction of heat energy from the upwardly facing rear lip 142 through the front tray wall 162 such that when the food items are placed in serving tray 153, they remain warm but additional cooking is stopped so as to prevent burning of these food items. When cooking is completed and the warming plate is in the open disposition 154, warming plate 104 including the food positioned in the warming plate 104 can be lifted directly upwards and detached from the griddle body 102 such that warming plate 104 can be carried to a counter or table where the food is to be served. This eliminates the need for a separate serving dish, thus reducing cleanup by using the warming plate 104 for both keeping food warm and serving the food.

After cooking is completed, countertop griddle 100 can be cleaned by hand or placed into an automated dishwasher. Warming plate 104 can be rotatably positioned in any of the covering disposition 150, the intermediate disposition 152 or open disposition 154 to remove the warming plate 104 from the griddle body 102 so as to facilitate placement within the dishwasher. Alternatively, the warming plate 104 can remain attached to the griddle body 102 during washing with the warming plate 104 arranged in any of the covering disposition 150, the intermediate disposition 152 or open disposition 154 so as to fit within the dishwasher. Similarly, the warming plate 104 can be removed from griddle body 102 or rotatably positioned in any of covering disposition 150, intermediate disposition 152 or open disposition 154 with respect to griddle body 102 so as to facilitate storage of the countertop griddle 100.

Although specific examples have been illustrated and described herein, it will be appreciated by those of ordinary skill in the art that any arrangement calculated to achieve the same purpose could be substituted for the specific examples shown. This application is intended to cover adaptations or variations of the present subject matter. Therefore, it is intended that the invention be defined by the attached claims and their legal equivalents.

The invention claimed is:

1. A countertop griddle, comprising:
a griddle body including a cooking surface; and
a warming plate attached to the griddle body, the warming plate being adapted to shift between a covering disposition and an open disposition in which the warming plate resides above at least a portion of the cooking surface with an upper tray surface facing downward toward the cooking surface when in the covering disposition and the warming plate presents a tray adapted to receive a food item with the upper tray surface facing upward when in the open disposition.

2. The countertop griddle of claim 1, wherein the warming plate is rotatably attached to the griddle body.

3. The countertop griddle of claim 2, wherein the warming plate, further comprises a pair of mounting arms and wherein the griddle body further comprises a pair of receiving channels, wherein each mounting arm mounts within the corresponding receiving channel to rotatably attach the warming plate to the griddle body.

4. The countertop griddle of claim 3, wherein the each of the receiving channels includes a spring member that interfaces with the mounting arm to lock the warming plate in the covering disposition, the open disposition or an intermediate disposition.

5. The countertop griddle of claim 4, wherein the warming plate is attachable or detachable from the griddle body only in the covering disposition, the open disposition or the intermediate disposition.

6. The countertop griddle of claim 4, wherein each mounting arm includes a mounting end portion having end wall defining a generally square cross-section and wherein the end walls interface with a pair of parallel inner sections on each spring member to lock the warming plate in the covering disposition, the open disposition or the intermediate disposition.

7. The countertop griddle of claim 1, wherein the tray comprises a tray wall height selected to substantially cover the food item when in the covering disposition such that a tray surface resides substantially parallel to the cooking surface.

8. The countertop griddle of claim 7, wherein the tray wall height is between about 0.5 inches to about 3.0 inches.

9. The countertop griddle of 8, wherein the tray resembles a serving tray when the tray is positioned in the open disposition, the serving tray defined by an upper tray surface, a front tray wall, a rear tray wall, a left tray wall and a right tray wall.

10. The countertop griddle of claim 1, wherein the griddle body includes a heating element mounted proximate a bottom surface of the cooking surface such that the warming plate is heated by conduction from the cooking surface when the warming plate is positioned in the covering disposition.

11. A method for serving cooked food, comprising:

placing a food item to be cooked on a cooking surface of a countertop griddle;

positioning a warming plate above at least a portion of the countertop griddle, wherein the warming plate is attached to the countertop griddle with an upper tray surface facing downward toward the cooking surface;

heating the warming plate with heat energy conducted from the cooking surface; and positioning the warming plate to receive a cooked food item such that the warming plate remains attached to the countertop griddle with the upper tray surface facing upward to accommodate the cooked food item.

12. The method of claim 11, wherein the warming plate is rotatably coupled to the countertop griddle, such that positioning the warming plate above at least a portion of the countertop griddle, comprises:

rotating the warming plate to a covering disposition above at least a portion of the countertop griddle.

13. The method of claim 12, further comprising:

cooking at least one food item underneath the warming plate in the covering disposition such that warming plate protects a user from grease splatter.

14. The method of claim 12, wherein positioning the warming plate to received the cooked food item, comprises:

rotating the warming plate to an open disposition defining a serving tray for receiving the cooked food item.

\* \* \* \* \*